June 11, 1968     J. FISHER     3,388,392
OPTICAL ENCODER

Original Filed Sept. 16, 1960     4 Sheets-Sheet 3

INVENTOR.
JOHN FISHER

June 11, 1968  J. FISHER  3,388,392
OPTICAL ENCODER
Original Filed Sept. 16, 1960  4 Sheets-Sheet 4

INVENTOR.
JOHN FISHER
BY Hudson, Boughton
Williams, David & Hoffmann
ATTORNEYS

United States Patent Office 3,388,392
Patented June 11, 1968

3,388,392
OPTICAL ENCODER
John Fisher, Aurora, Ohio, assignor to The Warner & Swasey Company, Cleveland, Ohio, a corporation of Ohio
Continuation of abandoned application Ser. No. 56,590, Sept. 16, 1960. This application Aug. 24, 1964, Ser. No. 393,807
14 Claims. (Cl. 340—347)

The present invention relates to encoders and particularly to optical encoders for digitally indicating shaft position.

This application is a continuation of my copending application Ser. No. 56,590, filed on Sept. 16, 1960, now abandoned.

An important object of the present invention is to provide a new and an improved encoder for digitally indicating shaft position, which encoder is highly accurate and relatively free from ambiguity but, yet, is compact in structure so as to accommodate its use in locations where space is at a premium.

A further object of the present invention is to provide a new and an improved optical encoder for converting shaft position into a number comprised of a plurality of binary digits, the encoder including a code wheel having a plurality of radially displaced zones extending circularly about the code wheel with each zone being comprised of alternate transparent and opaque areas and a light-responsive reader unit for reading each of the zones with the encoder being so constructed and arranged that the electrical outputs of the reader units for each zone are substantially the same when the units are subjected to maximum illumination for the corresponding zone.

It is also an object of the present invention to provide a code wheel for indicating shaft position in the Gray, or reflected binary, code with the code wheel having a digit value code zone for each digit of the Gray number except for the two digits of the Gray code which are representable by the two coarsest digit zones and which have the same number of divisions but which are angularly displaced from each other, these digits being represented by a single zone read by a reader which is angularly displaced.

In the above objects and in the following description and claims the word "transparent" area is intended to cover an area which transmits light and includes an open slit in an otherwise opaque wheel.

In accordance with the preferred embodiment of the present invention, the possibility of obtaining a false or an ambiguous reading from a code wheel having a plurality of circularly extending digit zone tracks thereon radially displaced from each other and read by light-responsive reader units disposed on one side of the wheel and responsive to light from a light source on the other side of the wheel disposed inwardly of the zone tracks and which illuminates the reader units through the transparent areas of the code wheel as they rotate past the units is minimized by providing a mask adjacent the code wheel with the mask having slits which correspond to respective ones of the zones to control the amount of light which passes from the light source through the transparent areas to the photocells and to provide more definite resolution as the zone being read by the reader unit changes from a transparent to an opaque area. The slits for the zones have different areas, with the areas of the slits being such that substantially equal quantities of light are transmitted by the slits when subject to full illumination. I have found that there is a point as one proceeds inwardly toward the light source, where the areas of the slits must be increased as one moves closer to the light source, rather than decreased as one would expect, to pass a given quantity of light. In other words, a slit of given area and defining a given arc, once inside this point, will pass less light as it is moved inwardly with the area and arc maintained constant. In the preferred embodiment, the slits are made as wide as possible in a circumferential direction with all slits subtending the same angular arc wherever possible and the radial extents of the slits for the zones varied to provide the area necessary for each slit to transmit the same amount of light as sensed by the reading units. The radial extents of the corresponding zones vary in accordance with the radial extents of the slits. Where the slits all subtend the same angular arc or increase in circumferential extent as one moves outwardly, the radial extent of the slits and zones can be made to decrease. In the preferred and illustrated embodiment, the angular arc subtended by the slit of the fine zone of the wheel is about half that of the angular arc subtended by the other slits of the encoder. In addition to the foregoing, two light responsive elements and corresponding slits are preferably provided for reading each zone with one photocell going dark as the other photocell goes light, with the outputs of the photocells being combined to provide the output signal of the reader unit for the zone. The construction as described, in addition to minimizing false and ambiguous readings, facilitates the provision of a compact wheel since the use of slits which have a greater circumferential extent as one proceeds away from the light source eliminates the need for extending the radial extent of the slits, and in turn of the zones to acquire a wheel which has reader units subjected to substantially equal amounts of light. The compactness of the wheel is further facilitated by interchanging zones of the wheel so that when proceeding outwardly from the center of the wheel, the zones do not progressively increase in divisions or resolution. In the preferred and illustrated embodiment, the wheel is coded in the Gray code where the successive digits of the code are respectively represented by zones which have $2^1$, $2^1$, $2^2$, $2^3$ . . . $2^{n-1}$ divisions, and the zones which would normally appear as the third and fourth digit zones of the code wheel proceeding outwardly from the center of the wheel, are interchanged so that they are positioned between the zones representing the sixth and seventh digits. Furthermore, the first and second digits are represented by a single zone with the single zone being read by two reader units angularly displaced from each other.

The elimination of false and ambiguous readings is also facilitated by supporting the light-responsive elements of the reader units in openings in the support member or members therefor with the openings extending along the path of light from the light source, preferably taking into consideration the refraction of light when the wheel or mask or both are of glass through the code wheel and the corresponding slits. This construction facilitates the reception of the maximum amount of light by the reader unit.

Further objects and advantages of the present invention will be apparent from the following detailed description made with reference to the accompanying drawings forming a part of the present specification and in which.

Figure 1:
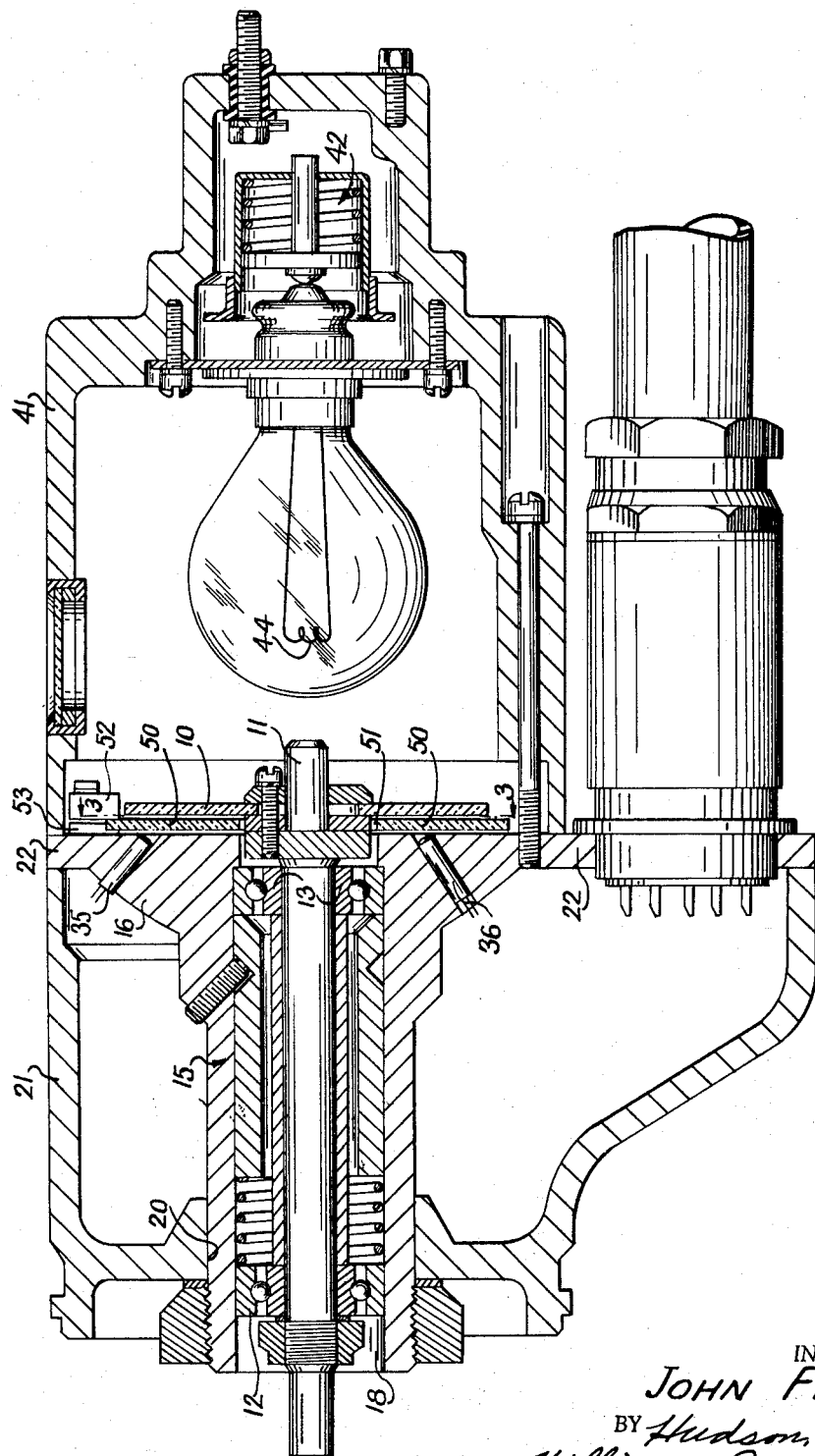
FIG. 1 is a longitudinal sectional view of an encoder constructed in accordance with the present invention.

Referring to the drawings, FIG. 1 is a sectional view through an encoder embodying the present invention. The encoder includes a code wheel 10, for indicating shaft position, fixed to a shaft 11 with the code wheel being coded in the Gray code. The shaft 11 is rotatably supported in a bore in an elongated support member 15 by ball bearings 12, 13, the member 15 having an enlarged part 16 at the end thereof adjacent to the wheel 10. The ball bearings 12, 13 are positioned in a bore 18 extending through the member 15 and the shaft 11 extends outwardly of each end of the bore 18, the portion of the shaft 11 extending outwardly of the right-hand end of the bore 18 adjacent to the enlarged part 16 having the code wheel 10 secured thereto for rotation therewith. The support member 15 is pressed into a bore 20 in the bottom of a cup-shaped casting 21 and the enlarged part 16 has a peripheral portion 22 which extends outwardly from the periphery of the enlarged part 16 to close the open end of the casting 21.

Figure 2:
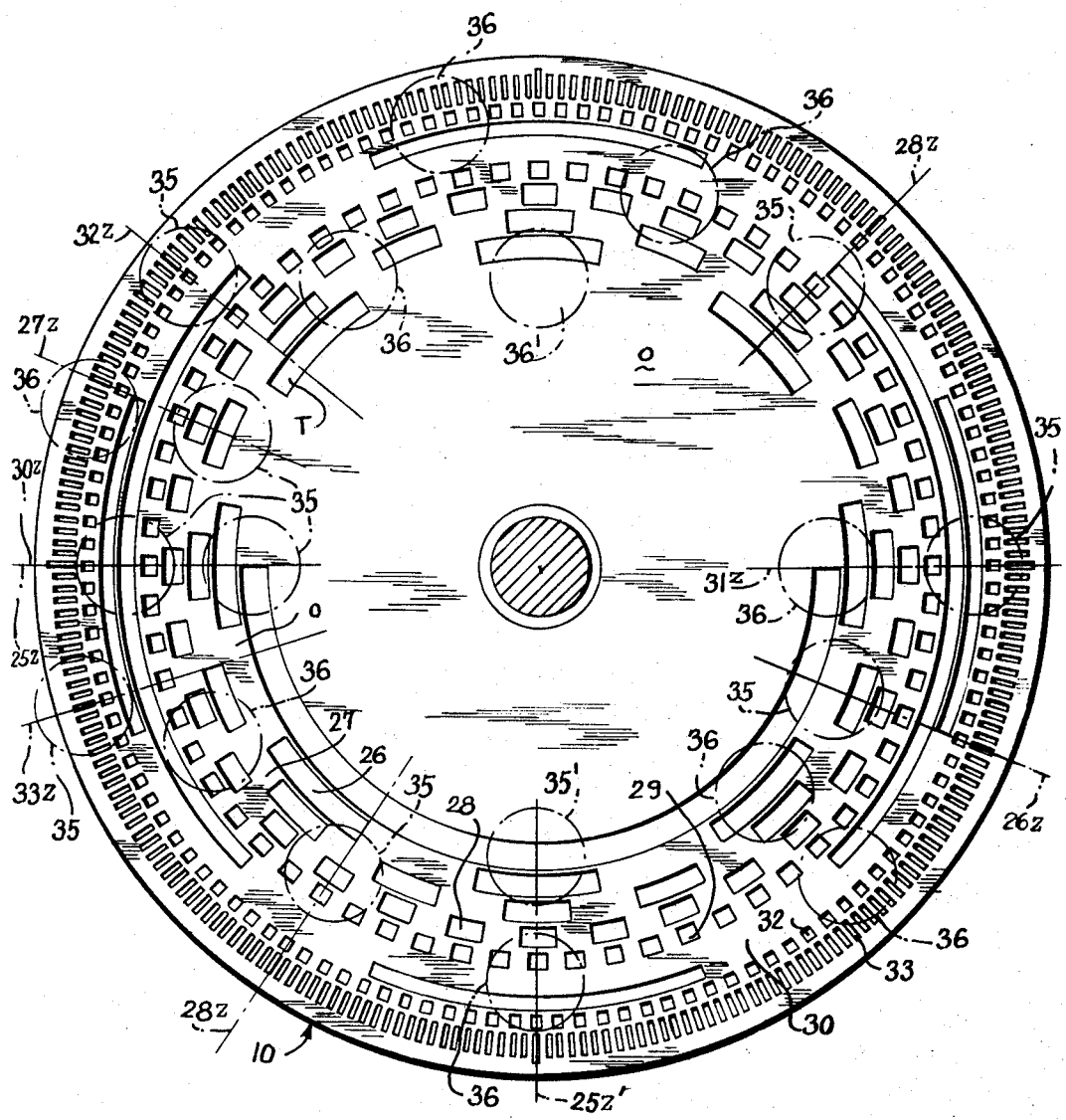
FIG. 2 is a view of the encoding wheel looking at the face of the encoding wheel.

The code wheel 10 is preferably coded in the Gray, or reflected binary, code. This code is described in detail in Gray Patent No. 2,632,058 and is well understood by those skilled in the art. The code of the code wheel is best shown in FIG. 2 and, as shown therein, comprises a plurality of concentric code zones 25, 26, 27, 28, 29, 30, 31, 32, 33, each zone extending circularly about the code wheel with the zones being radially displaced from each other and with each zone being comprised of a different number of alternate transparent and opaque areas, respectively designated by the reference characters T and O representing divisions of the zone.

In the conventional Gray code, the two coarsest, i.e., the $2^1$ digits, are normally represented by zones each of which have two divisions extending 180° with the code zones being displaced from each other by 90°, and each successive digit of the number is represented by a zone having a number of divisions represented by $2^{n-1}$. Consequently, the third digit zone has a number of divisions in the zone corresponding to $2^2$; the fourth digit zone, $2^3$; the fifth digit zone, $2^4$; and the sixth digit zone $2^5$; the seventh digit zone, $2^6$; the eighth digit zone, $2^7$; and the ninth digit zone, $2^8$. Conventionally, each digit is represented by a separate code zone on the disk, with the two coarsest digits being represented by separate code zones having opaque and transparent areas displaced by 90° from the zero reading line of the zone. In the illustrated disk, the two coarsest digits are combined into one zone but are read by two separate reading heads, as described in more detail hereinafter. Furthermore, in the conventional Gray code wheel, the zones are arranged in the order of their number of divisions proceeding radially outwardly from the center of the wheel. In the disclosed and described code wheel, the third and fourth digit zones having $2^2$ and $2^3$ divisions therein are disposed intermediate the zones 29 and 32 for the eighth and ninth digits, respectively. The interchanging of the zones of the code wheel in the manner described facilitates the provision of a compact wheel, as pointed out hereinafter.

Each of the zones is read by a reader unit comprising, in the illustrated embodiment, a pair of photocells 35, 35 for each code zone of the wheel. Since the two coarsest digits of the code are represented by one code zone 25 on the code wheel, the zone 25 is provided with two pairs of photocells 35, 36, on of the sets of the photocells 35, 36 having a prime appended thereto to indicate the reader unit for one zone, with the other pair being designated by the reference numerals 35, 36 to indicate a reader unit for the other zone combined into the one zone 25. The photocells 35, 36 for reading each zone are displaced from each other so that when one cell is at the center of an opaque division, the other cell is at the center of a transparent division. Consequently, when one cell is going dark as an area is changing from transparent to opaque, the other cell is going light since the area opposite that cell will be changing from opaque to transparent, and vice versa. The photocell 35 of each zone is located on what is normally the zero reading line of the zone and it will be noted that the zones are angularly displaced so that the zero reading lines of the various zones are not aligned. The zero reading lines for each zone are indicated by a dot-dash line designated by the same reference character as the corresponding zone but with a z appended thereto.

The light for reading the code wheel is provided by a light source 40 illustrated in the form of an incandescent lamp disposed on the side of the wheel 10 opposite the photocells 35, 36. The lamp 40 is mounted in a cup-shaped holder 41, bolted or otherwise secured to the peripheral portion 22 of the enlarged part 16 and including a socket structure 42 in the bottom of the holder for removably supporting and energizing the lamp 40. The center line of the lamp 40 is generally aligned with the axis of the shaft 11 so that the filament 44 is disposed on the extended axis of the shaft 11.

Figure 4:
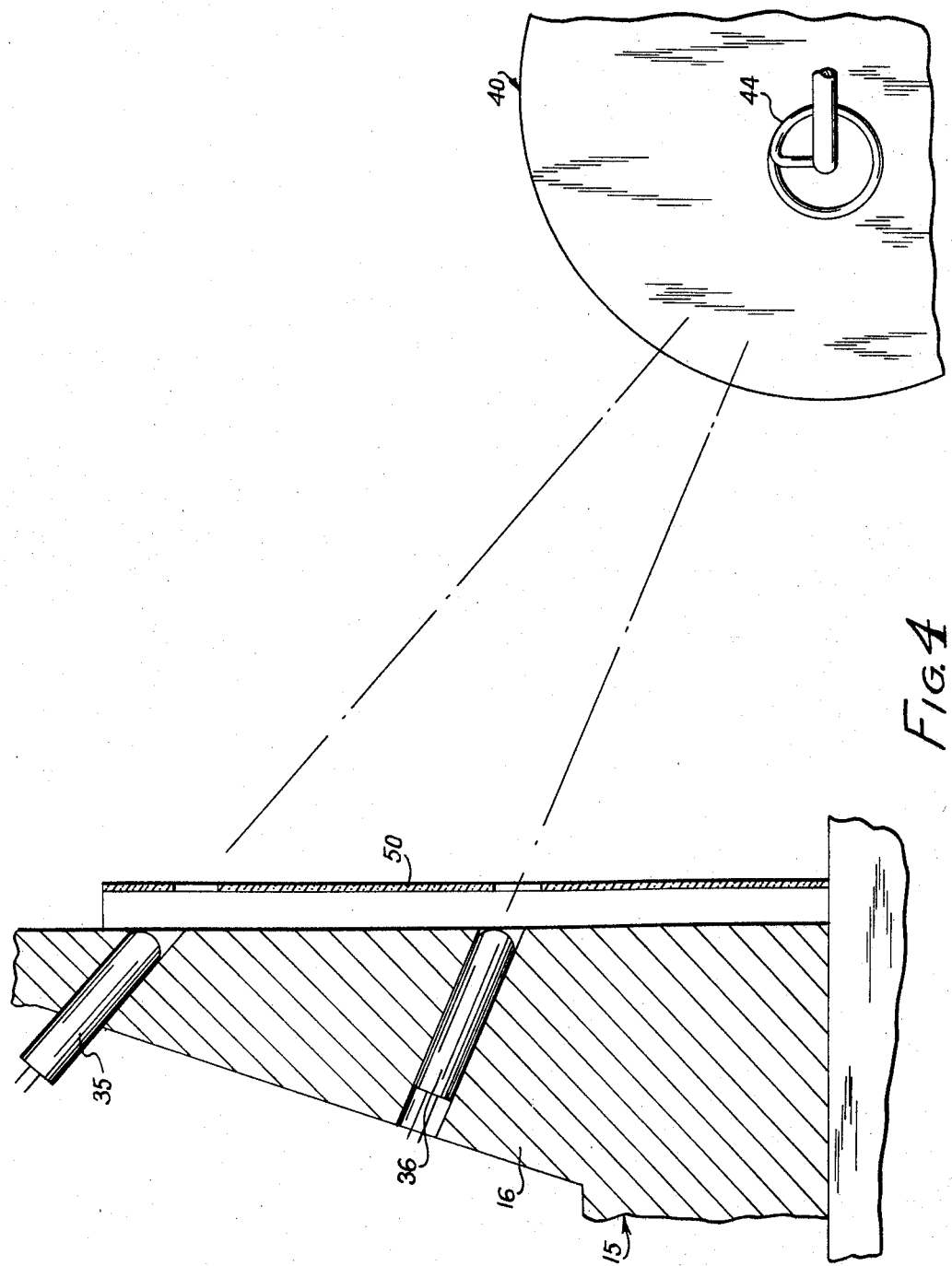
FIG. 4 is a fragmentary sectional view of part of FIG. 1 on an enlarged scale.

The light rays emanating from the filament 44 will pass through the transparent areas of the code wheel 10 to the photocells 35, 36 when a transparent area is opposite the photocells 35, 36. It will be apparent from a consideration of FIGS. 1 and 4 that the path of direct light rays from the filament through a transparent area of the disk to a photocell has a different angle of inclination for the photocells of the different code zones. In other words, the light rays traveling from the filament 44 to the photocells of the innermost zone have a path of one inclination with respect to the axis of the shaft 11, while the light rays traveling from the filament 44 to the photocells for reading the outermost zone have a path which has a much greater angle of inclination with respect to the shaft axis. In accordance with one feature of the present invention, the photocells are mounted in the enlarged portion 16 and are each received in an opening or bore which extends along the path for light from the filament through a transparent area opposite to the photocell so that the optical axis of the photocell lies along the path of light to the cell. This provides the maximum response of the light-responsive photocells to the light passed by the transparent areas of the wheel. While the photocells have been shown as mounted on a single support member and while this is preferable to provide a compact wheel, in environments where a compact wheel is not a prime requisite, the photocells might be mounted on separate members having bores or openings which extend along the direct light path from the cell to the filament. It will be understood that where the wheel is of glass or other medium which refracts light, the path for light from source to the cells will be a refracted light path and the cell is positioned with its optical axis along the refracted path.

If ambiguities of the readings are to be prevented, it is important that stray light does not destroy the accuracy of the reading by the photoelectric cells. To provide improved definition, a mask is disposed between the code wheel 10 and the enlarged part 16 and is designated by the reference numeral 50. This mask could also be positioned immediately in front of the wheel. The mask 50 has a slit opposite each of the photocells and the slits have been given the same reference character as the zones read by the corresponding photocells with an s appended thereto. It will be seen that the slits for the photocells for reading the coarsest zone 25 are designated by the reference character 25s; while those slits disposed opposite the photocells for reading the outermost zone are designated by the reference character 33s, etc. The mask 50 has an opening 51 therein through which the shaft 11 extends and is clamped in position by a clamp block 52 which clamps the mask against a cooperating block 53 fixed to the enlarged part 16. It will be appreciated that a plurality of such pairs of clamp blocks is provided for mounting the mask.

In accordance with the present invention, the slits are proportioned so that with full illumination from the light source the slits will pass substantially the same quantity of light. Although the intensity of the light from the light source has an inverse relationship with respect to the distance from the source, I have found that when slits are positioned close to the axis, as in the preferred embodiment, a slit of a given area will pass a quantity of light which has a direct relationship to its distance from the slit rather than an inverse relationship. Consequently, the slits 25s, 26s, 27s, 28s, 29s, actually may have to decrease in area in the order named to provide slits which transmit substantially equal quantities of light when subject to full illumination. In the encoder which was constructed, the slits 25s–29s were respectively positioned from the axis of the mask, and the areas of the slits decreased proceeding outwardly from the axis of the mask.

Figure 3A:
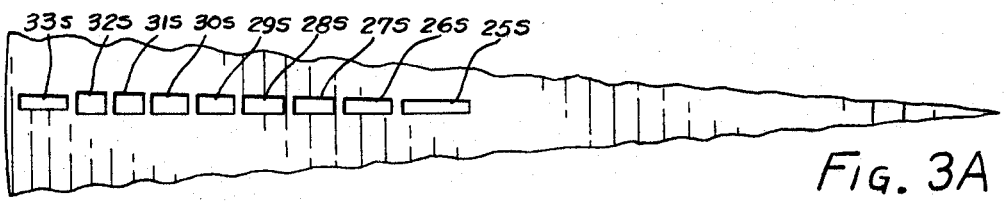
FIG. 3A is a schematic view showing certain of the slits of the mask of FIG. 3 rotated from their positions shown in FIG. 3.
Figure 3:
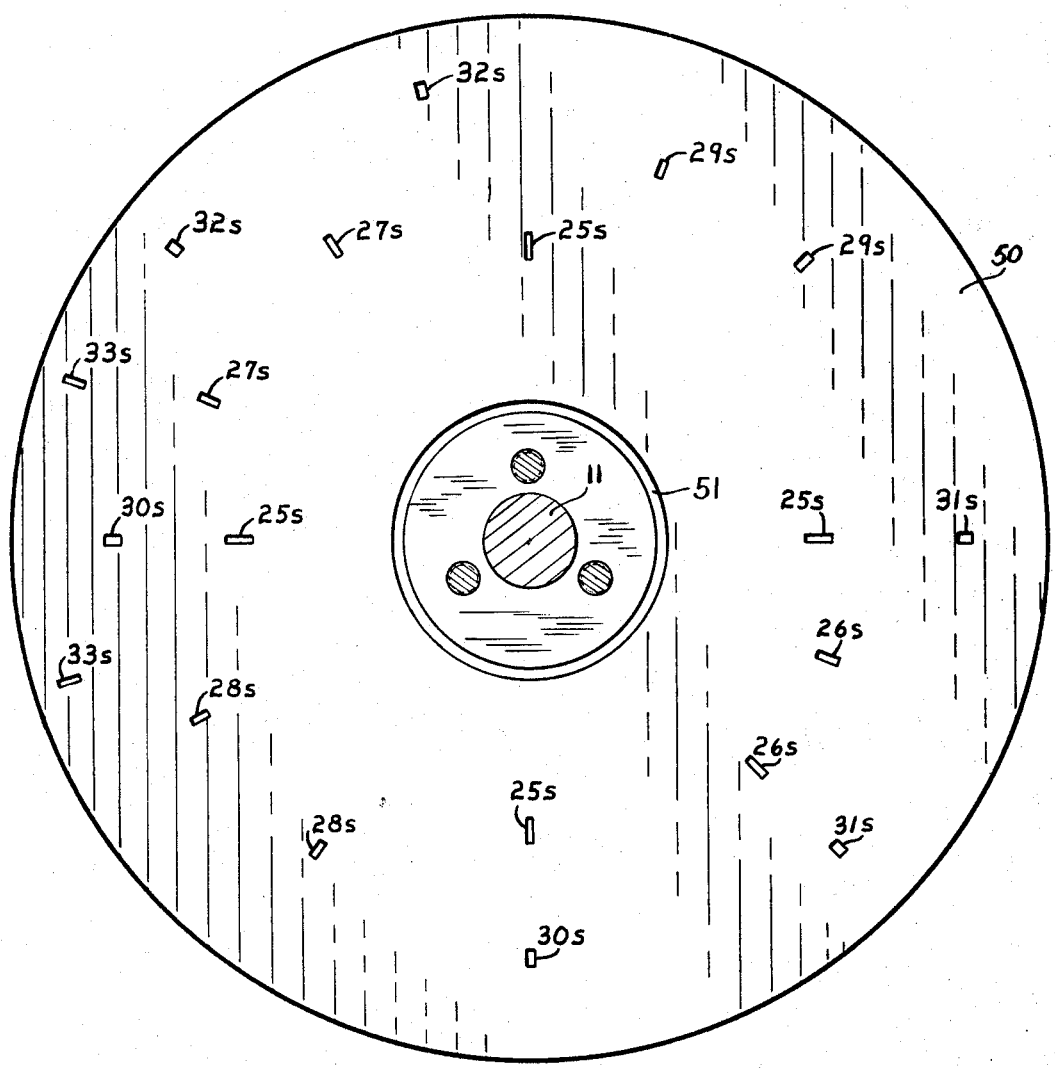
FIG. 3 is a sectional view taken approximately along line 3—3 of FIG. 1.

Preferably, for all zones where it is possible, the slits subtend the same angular arc as the slits 25s so that the same angular movement of the wheel is necessary to move the edge of an opaque or transparent area from one side of the slit to the other and the area is adjusted by varying the radial extent of the slits. Referring to FIG. 3, it will be apparent that the slits decrease in radial extent proceeding outwardly from the filament to provide the area necessary for passing the same quantity of light as the slits of the more inwardly disposed zones. FIG. 3A has the slits all rotated to a position where the center line of the slits lie along a single radius. It is apparent therefrom that the radially extending sides of the slits lie along radii which in each case define equal angles with each other with the exception of the slit for the finest zone. Furthermore, the radial extent of each slit varies to provide slits having the areas necessary to provide the same quantity of light when the slits are subjected to full illumination by the light source. It will be noted that the slits 33s for the finest zone subtend an arc of a much smaller angle than the other slits and this is due to the fact that the divisions of the fine zone in the illustrated code wheel are so fine that a larger slit would interfere with the definition obtained. Accordingly, the slit is made as wide as possible consonant with the requirements of definition, and the radial extent of the slit is such as to provide the necessary slit area so that the slit passes the same quantity of light as the other slits.

It will be noted that the radial extents of the zones vary in the same manner as the slits and decrease proceeding outwardly from the center of the code wheel except for the finest zone. This arrangement enables the diameter of the wheel to be kept at a minimum. The variation in radial extent of the zones is clearly shown in FIG. 2.

As pointed out hereinbefore, the photoelectric cells for reading the various zones are not aligned on a single zero reading line but rather the zero lines of the various zones are angularly displaced from each other and the cells are correspondingly displaced so that the photocells are distributed about the code wheel. This facilitates the use of two cells for each zone in a small space without interfering with the definition of the wheel.

While the Gray code has been utilized in the described structure, it will be understood that certain aspects of the present invention are equally applicable to code wheels coded in other codes, such as the straight binary code. For example, the use of different size slits and the interchanging of zones would be useful in a binary coded wheel.

Furthermore, certain aspects of the present invention, such as the interchanging of the zones of the wheel and the use of a single code zone where the code has two digits represented by code zones with equal number of divisions are applicable in encoders using other than photoelectric means to read the code on the wheel, for example, the code could consist of areas which are alternately magnetic and nonmagnetic or electrically conductive and nonelectrically conductive.

The preferred embodiment of the present invention has been described as utilizing two photoelectric elements or cells for reading each of the zones which represent individual digits of the number representing the angular position of the shaft. The two cells for reading a zone are interconnected to provide one output level when a transparent area is opposite to one cell and a lower output level when an opaque area is opposite to the same cell. The manner of combining the output of the photocells to provide a single output signal having a high level when a transparent area is opposite to one of the photocells and a low level when an opaque area is opposite to the same photocell does not, per se, form a part of this invention and has not, therefore, been described. Suffice it to say, that for the purpose of the present invention, when two photocells are utilized for reading a zone, regardless of whether it is in the manner described or for some other reason, such as to compensate for backlash, the displacing of the zones so that the photocells are distributed about the code wheel facilitates the mechanical construction of the wheel in compact form. One encoding device where two photocells are utilized to read each zone of a code wheel is described in Patent No. 2,779,539 issued to Sidney Darlington.

The code wheel and disk have not been described in detail since the techniques for making code wheels having alternate opaque and transparent areas are known and the same techniques may be utilized for constructing the disk of the present invention. Preferably, the code wheel is a glass code wheel having a photographic surface on one side thereof which is developed to provide the opaque and transparent areas. This technique of manufacturing a code disk is a known technique. The mask is preferably constructed in the same manner as the code disk.

The preferred and described embodiment of the present invention utilizes photoelectric cells as light-responsive elements for reading the code wheel. It will be appreciated that other light-responsive elements may be used. Furthermore, it will be recognized that other radiation which can be either blocked or transmitted by a code wheel and mask in the same manner as light is the equivalent of light insofar as the present invention is concerned and a source of such radiation and devices responsive to such radiation would be the equivalent of the photocells and light source shown herein.

While the preferred embodiment of the present invention has been described in considerable detail, it is hereby my intention to cover all modifications, constructions, and arrangements which are apparent to those skilled in the art and which fall within the scope and spirit of the present invention.

Having described my invention, I claim:

1. A coding device for digitally indicating shaft position comprising a code wheel having a code thereon in the form of a plurality of concentric code zones each comprised of alternate transparent and opaque areas, said zones being displaced radially from each other and each zone extending circularly about the axis of said wheel, a plurality of reader units including a unit for each zone disposed on one side of said wheel and positioned to receive light through the transparent areas of the corresponding zone as the areas rotate by the unit, said units each including a light-responsive element, a light source mounted on the other side of said wheel and disposed radially inwardly of said wheel from said reader units, a light blocking mask adjacent said wheel and blocking light traveling from said source to said reader units, said mask having a slit therein opposed to each reader unit and adjacent the corresponding zone to allow the passage of light from the light source through a transparent area of the zone when passing said slit to said light-responsive elements, said slits having areas proportioned such that the quantity of light passed by each slit when subjected to full illumination from said source through a transparent area of said code being substantially the same for all of said slits.

2. An encoding device as defined in claim 1 wherein each of said reader units comprises a light-responsive element disposed to intercept the light transmitted through the transparent areas of the corresponding zone and the corresponding slit, a member supporting each of said units with the optical axes of said elements being inclined with respect to said wheel and along the path of the light received by the element from said light source.

3. A coding device as defined in claim 1 wherein said slits have sides lying along radii emanating from the extended axis of said wheel with the radii for each slit defining a given angle which is the same for a plurality of said slits for different zones and wherein the radial extent of said plurality of slits and the corresponding zones decreases as one proceeds outwardly from the center of said wheel.

4. An encoding device as defined in claim 3 wherein each of said reader units comprises a light-responsive element disposed to intercept the light transmitted through the transparent areas of the corresponding zone and the corresponding slit, a member supporting each of said units with the optical axes of said elements being inclined with respect to the wheel and lying along the path of the light received by the element from said light source.

5. In a coding device as defined in claim 1 wherein the radial extent of a plurality of said slits and zones decreases proceeding outwardly from the center of said wheel and the circumferential extent of said slits increases proceeding outwardly from the center of said wheel.

6. A code wheel as defined in claim 1 wherein said code is the Gray code in which two digits of the Gray numbers are representable by zones having the same number of divisions but which zones are displaced angularly with respect to each other, said code wheel having a single zone thereon representing both of said digits of the code and two angularly displaced reader units for said single zone.

7. A coding device as defined in claim 1 wherein more than two of said code zones have different numbers of divisions therein and wherein at least one of said plurality of code zones is disposed between zones which each have a greater number of divisions than said one of said plurality of code zones, and said reader units each comprises angularly displaced reading elements.

8. A code wheel as defined in claim 7 wherein said code is the Gray code in which two digits of the Gray numbers are representable by zones having the same number of divisions but which zones are displaced angularly with respect to each other, said code wheel having a single zone thereon representing both of said digits of the code and two angularly displaced reader units for said single zone.

9. A coding device comprising a code wheel having a plurality of concentrically arranged circular code zones thereon with each zone comprising alternate transparent and opaque areas, a light source disposed on one side of said zones and inwardly of said wheel with respect to said zones, a light-responsive reader unit for reading each of said zones, supported adjacent the other side of said wheel adjacent the zone read by the unit, said units comprising a light-responsive element, a light mask mounted adjacent said wheel and having a slit corresponding to each of said zones and adapted to pass light from said source to said element of said corresponding reader unit for the zone when a transparent area of the zone is moving past the slit and reader unit, said slits increasing in circumferential extent proceeding outwardly from the center of said wheel and said zones and slits decreasing in radial extent proceeding outwardly from the center of said wheel.

10. A code wheel as defined in claim 9 wherein said code is the Gray code in which two digits of the Gray numbers are representable by zones having the same number of divisions but which zones are displaced angularly with respect to each other, said code wheels having a single zone thereon representing both of said digits of the code and two angularly displaced reader units for said single zone.

11. A coding device comprising a code wheel having a plurality of concentrically arranged circular code zones thereon with each zone comprising alternate transparent and opaque areas, a light source disposed on one side of said zones and inwardly of said wheel with respect to said zones, a respective light-responsive reader unit for reading each of said zones supported adjacent the other side of said wheel adjacent the zone read by the unit, a light mask mounted adjacent said wheel and having a slit corresponding to each of said zones and disposed intermediate the reader unit for the zone and the wheel and adapted to pass light transmitted by a transparent area of the zone to the reader unit, said slits increasing in circumferential extent proceeding outwardly from the center of said wheel and said zones and slits decreasing in radial extent proceeding outwardly from the center of said wheel, said slits having sides lying substantially alonge radii emanating from the extended axis of said wheel with the angle defined by the radii for each of said slits being substantially the same as the angle defined by the radii of the other slits.

12. A coding device comprising a member having a code thereon in the form of opaque and transparent areas, said code lying in a plane, a light source on one side of said code and positioned such that light traveling from said source through a transparent area of said code travels a path inclined with respect to said plane, a reader unit comprising a light-responsive element supported on the other side of said member and adapted to receive light from said source when a transparent area is opposite to said element, a support member mounting said unit with the optical axis thereof along the path for light from said source through a transparent area to said unit.

13. A code wheel as defined in claim 11 wherein said code is the Gray code in which two digits of the Gray numbers are representable by zones having the same number of divisions but which zones are displaced angularly with respect to each other, said code wheel having a single zone thereon representing both of said digits of the code and two angularly displaced reader units for said single zone.

14. A coding device for digitally indicating angular position by a number having a plurality of digits therein and representable by divisions of a circular zone on a code wheel, certain digits of said number being representable by code zones having the same number of divisions but angularly displaced from one another, a code wheel having a plurality of concentric code zones thereon representing said digits and including a single code zone representing said certain digits and reader units corresponding in number to said certain digits for reading said single code zone, said units being angularly displaced from one another.

References Cited

UNITED STATES PATENTS 3,218,626   11/1967   Schuman _____ 340—347

FOREIGN PATENTS 932,135   8/1960   Great Britain.

MAYNARD R. WILBUR, *Primary Examiner.*

G. R. EDWARDS, *Assistant Examiner.*